United States Patent [19]

Conn

[11] Patent Number: 4,870,817
[45] Date of Patent: Oct. 3, 1989

[54] GAS TURBINE ENGINE STARTING MECHANSIM

[75] Inventor: Francis E. Conn, Plainfield, Ind.

[73] Assignee: General Motors Corporation, Detroit, Mich.

[21] Appl. No.: 202,339

[22] Filed: Jun. 6, 1988

[51] Int. Cl.[4] .............................................. F02C 7/275
[52] U.S. Cl. ................................ 60/39.141; 60/39.161; 192/42; 192/45
[58] Field of Search ........... 60/39.141, 39.161, 39.163, 60/39.091; 244/53 A; 192/45, 42

[56] References Cited

U.S. PATENT DOCUMENTS

| | | | |
|---|---|---|---|
| 2,723,531 | 11/1955 | Wosika et al. | 60/39.141 |
| 2,952,973 | 9/1960 | Hall et al. | 60/244 |
| 3,481,145 | 12/1969 | Oldfield | 60/39.141 |
| 3,722,213 | 3/1973 | Carter et al. | 60/39.163 |
| 3,750,782 | 8/1973 | Costantini et al. | 192/45 |
| 4,062,185 | 12/1977 | Snow | 60/204 |
| 4,062,186 | 12/1977 | Snow et al. | 60/226 |
| 4,674,276 | 6/1987 | Kitaguchi | 60/39.163 |

FOREIGN PATENT DOCUMENTS

| | | | |
|---|---|---|---|
| 2393980 | 2/1979 | France | 192/45 |
| 703262 | 2/1954 | United Kingdom | 60/39.142 |

Primary Examiner—Donald E. Stout
Attorney, Agent, or Firm—Saul Schwartz

[57] ABSTRACT

An in-flight starting mechanism for a gas turbine engine in a propeller type aircraft propulsion system wherein the propeller is driven by a free power turbine rotor rotatable independently of the gasifier rotor of the engine. The starting mechanism includes an inner race, an outer race and a plurality of rollers in pockets in the outer race. The rollers are centrifugally biased out of engagement with an inner race surface of the inner race when both the free power and gasifier rotors are driven normally in the forward or propelling direction. The pockets are evenly spaced around the inner race so that at least some of the rollers are moved by gravity against the inner race surface when the rotors are substantially stopped as occurs when the engine is shutdown in flight and the propeller feathered. Thereafter, as the propeller is unfeathered and the energy extracted from the passing airstream drives the free power turbine rotor in the forward direction, the inner race surface energizes the rollers to wedge between the inner and outer races to effect a positive connection between the rotors whereby the gasifier rotor is backdriven by the propeller to initiate engine restart.

2 Claims, 1 Drawing Sheet

4,870,817

GAS TURBINE ENGINE STARTING MECHANSIM

FIELD OF THE INVENTION

This invention relates to in-flight starting mechanisms for gas turbine engines in propeller-type aircraft propulsion applications.

BACKGROUND OF THE INVENTION

In single spool turboshaft gas turbine engines in propeller-type aircraft propulsion applications, the compressor, the turbine and the output shaft all rotate as a unit. If such engines are shutdown in flight, the pitch of the propeller blades can be adjusted to extract energy from the airstream around the aircraft to backdrive the compressor to provide enough compressed air to sustain an in-flight restart. In free power turbine type engines and other multiple spool gas turbine engines, the propellers are driven by a turbine which rotates independently of the gas generator of the engine so that the propeller blades are ineffective to backdrive the gas generator compressor. Accordingly, aircraft equipped with such engines must also be equipped with in-flight starting assist devices such as auxiliary power units (APU's). An in-flight starting mechanism according to this invention selectively and automatically positively connects the propeller driving turbine rotor to the gas generator rotor so that in-flight restarts can be effected without APU's or like auxiliary devices.

SUMMARY OF THE INVENTION

This invention is an in-flight starting mechanism for gas turbine engines in propeller-type aircraft propulsion applications wherein the engines have free power turbines or multiple spools. The in-flight starting mechanism according to this invention automatically cycles from an off condition to a ready condition and then to an on condition in response to back-driven rotation of the propeller driving turbine rotor from stop after both the propeller driving turbine rotor and gasifier rotor are stopped. The starting mechanism according to this invention includes an inner race defining a cylindrical inner race surface, an outer race around the inner race having a plurality of wedge shaped pockets around and facing the inner race surface, and a plurality of cylindrical rollers in the pockets. When the power turbine and gasifier rotors are driven by the hot gas motive fluid at engine idle speed or higher, the mechanism is off with the rollers centrifugally biased to releasing positions at the wide ends of the pockets out of contact with the inner race surface. When the rotors are substantially stopped, as occurs in an in-flight shutdown with propeller blades feathered, at least some of the rollers are biased by gravity toward the inner race surface to cycle the mechanism to the ready condition. Thereafter, when the propeller blades are progressively unfeathered, the mechanism cycles to the on condition as forward rotation of the power turbine rotor wedges the roller between the inner and outer races toward the narrow ends of the pockets thereby effecting a driving connection between the power turbine rotor and the gas generator rotor.

DESCRIPTION OF THE PREFERRED EMBODIMENT

Figure 1:
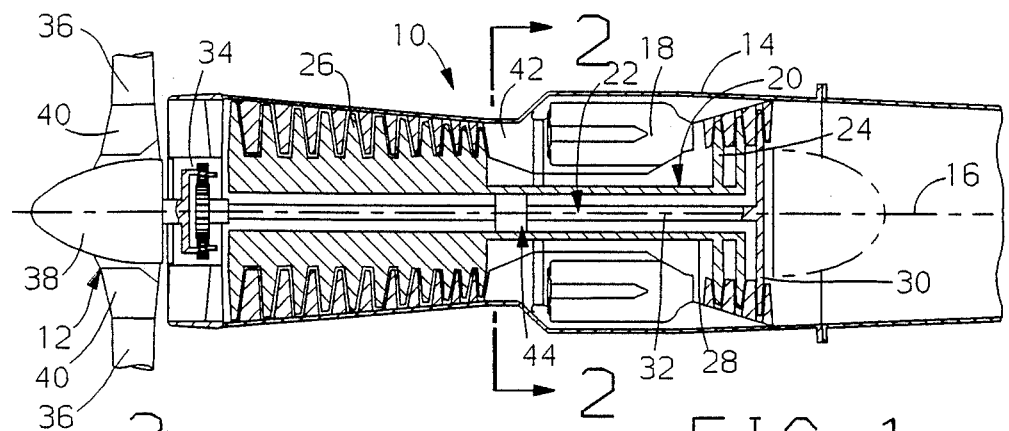
FIG. 1 is a schematic longitudinal sectional view of a turboshaft gas turbine engine, in a propeller type aircraft propulsion application, having an in-flight starting mechanism according to this invention.

Referring to FIG. 1 of the drawings, a turboshaft gas turbine engine 10 is schematically illustrated in a propeller type aircraft propulsion system including a propeller assembly 12. The engine 10 is representative of free power turbine type gas turbine engines as well as other multi-spool gas turbine engines and includes a casing 14 adapted for rigid attachment to the air frame, not shown, of the aircraft. The casing defines a main axis 16 of the engine about which is disposed an annular combustor 18 of the engine and about which rotates a gasifier rotor 20 of the engine, a free power turbine rotor 22 of the engine, and the propeller assembly 12.

The gasifier rotor 20 includes a two stage high pressure turbine 24 downstream of the combustor 18, a multi-stage compressor 26 upstream of the combustor 18, and a tubular shaft 28 rigidly interconnecting the high pressure turbine and the compressor. Bearings, not shown, support the gasifier rotor 20 on the casing for rotation about the main axis 16.

The free power turbine rotor 22 includes a single stage low pressure turbine 30 downstream of the high pressure turbine 24 and a center shaft 32 rigidly connected to the low pressure turbine. Bearings, not shown, support the rotor 22 on the casing for rotation about the main axis 16 independently of the gasifier rotor 20. The center shaft 32 is drivingly connected to the propeller assembly 12 through a schematically illustrated planetary gear set 34 such that the propeller assembly rotates whenever the free power turbine rotor 22 rotates and vice versa.

The propeller assembly 12 is conventional and includes a plurality of propeller blades 36 connected to a hub portion 38 of the assembly 12 through a corresponding plurality of schematically represented pitch change devices 40. The pitch change devices 40 selectively adjust the pitch of the propeller blades 36 to any of a plurality of pitches in a range of from fully feathered to fully unfeathered. When fully feathered, the propeller blades are ineffective to either propel the aircraft or to extract energy from an airstream passing over the aircraft. When fully unfeathered, the propeller blades are effective to propel the aircraft and to extract energy from an airstream passing over the aircraft. The efficiency of the propeller blades in propelling the aircraft and in extracting energy from a passing airstream increases as the propeller blades are unfeathered.

The engine 10 is normally ground-started with the assistance of ground based starting equipment in a sequence which includes rotating the gasifier rotor 20 to initiate flow of compressed air to a plenum 42 around the combustor 18. Fuel flow to the combustor is initiated and combustion of the fuel/air mixture in the combustor results in a continuous stream of hot gas motive fluid. The motive fluid expands first through the high pressure turbine 24 and then through the low pressure turbine 30. When the engine is self sustaining, the turbines 24 and 30 extract energy from the motive fluid to power the compressor 26 and to power the propeller assembly 12, respectively.

The aircraft must have a restart capability in the event that the engine 10 is shutdown in flight. While the propeller blades 36 have the inherent capability of extracting energy from the airstream around the airborne aircraft, this energy can not be transferred to the gasifier rotor 20 because there is no positive driving connection between the gasifier rotor and the free power turbine rotor. In addition, because the compressor 26 is likely equipped with efficiency increasing variable geometry features, ram air entering the inlet of the compressor is unlikely to sustain an in-flight restart. To permit use of the energy of the airstream around the aircraft for in-flight engine restarting, an in-flight starting mechanism 44 according to this invention is interposed between the free power turbine rotor 22 the gasifier rotor 20. While the starting mechanism 44 is as disposed in the center of the engine 10 directly between the shafts 28 and 32 of the gasifier and power turbine rotors, other suitable locations are possible.

Figure 2:
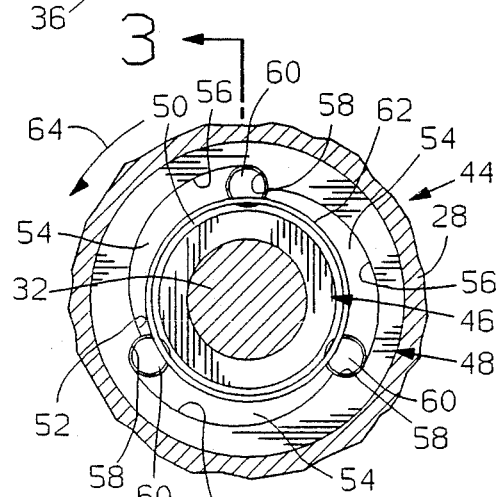
FIG. 2 is an enlarged view taken generally along the plane indicated by lines 2—2 in FIG. 1 and showing the in-flight starting mechanism in the off condition.
Figure 3:
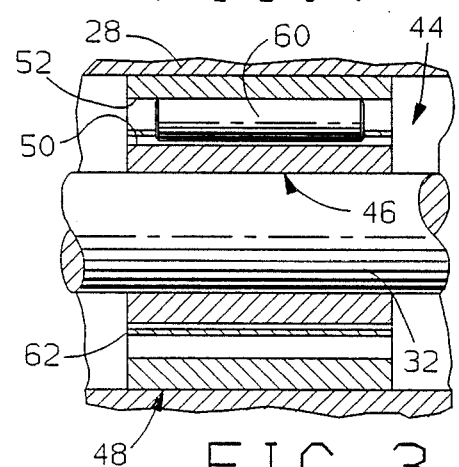
FIG. 3 is a sectional view taken generally along the plane indicated by liners 3—3 in FIG. 2.
Figure 4:
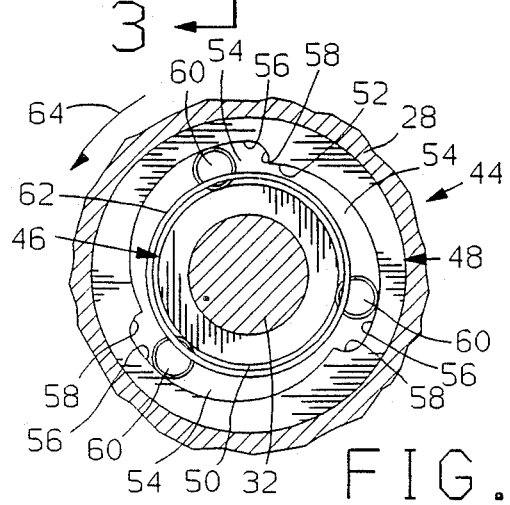
FIG. 4 is similar to FIG. 2 but showing the in-flight starting mechanism in the on condition.

As seen best in FIGS. 2–4, the starting mechanism 44 includes a ring-like inner race 46 and a ring-like outer race 48 around the inner race. The inner race 46 is rotatable as a unit with the center shaft 32 of the free power turbine rotor 22 about the main axis 16. The outer race 48 is connected to and rotatable as a unit with the tubular shaft 28 of the gasifier rotor 20 about the main axis 16.

The inner race 46 has a plain cylindrical inner race surface 50 centered on the main axis 16. The outer race has an irregularly shaped inside surface 52 in which are formed a plurality of generally wedge-shaped roller pockets 54. Each pocket 54 is bounded in the radial direction by a ramp wall 56 which flares out from the inside surface 52 and lengthwise by a generally radially extending end wall 58.

A rolling element in the form of a cylindrical roller 60 is disposed in each pocket 54. The rolling elements may also be spheres. The rollers are held in generally uniform circumferential spaced relationship around the inner race surface 50 by a cage 62. The radial depth of the wide ends of the pockets 54 is calculated to assure that rollers 60, when abutting the end walls 58, do not contact the inner race surface 50.

The starting mechanism 44 operates as follows. With the aircraft on the ground and the engine off, the rotors 20 and 22 are stopped. The gasifier rotor 20 is rotated in a forward direction corresponding to normal flight propulsion and represented by an arrow 64, FIGS. 2 and 4. Centrifugal force biases each of the rollers 60 against the ramp walls 56 and toward engagement on the end walls 58 at the wide ends of the pockets 54 whereat the rollers are out of contact with the inner race surface 50. The starting mechanism 44 is then in an off condition, FIG. 2, in which it does not interfere with normal operation of the engine.

If the engine is shutdown in flight, the propeller blades 36 are brought to their fully feathered positions. Because the fully feathered propeller blades do not extract energy from the passing airstream, the propeller assembly 12 and the free power turbine rotor 22 substantially stop rotating. Likewise, the gasifier rotor 20 substantially stops rotating in the absence of hot gas motive fluid, thus relieving the radial outward centrifugal bias on the rollers 60. When both rotors 20 and 22 stop or substantially stop, the starting mechanism 44 cycles to a ready condition characterized by one or more of the rollers being in contact with the inner race surface 50. The circumferential spacing of the pockets 54 assures that at least one of the rollers 60 will always be moved by gravity into contact with the inner race surface 50 when the high pressure spool stops or substantially stops.

With the starting mechanism in the ready condition, the propeller blades 36 are moved progressively from the fully feathered positions toward the fully unfeathered positions which causes the propeller assembly and the free power turbine rotor 22 to commence rotating in the forward direction. The direction in which the ramp walls 56 flare away from the inside surface 52 of the outer race is coordinated with the forward direction of the free power turbine rotor 22 such that inner race surface 50 on the inner race moves toward the narrow ends of the pockets 54 as the rotor 22 commences forward rotation relative to the gasifier rotor 20. Any of the rollers 60 not contacting the inner race surface 50 are moved by the cage 62 along the ramp wall 56 toward the narrow end of the pocket 54. Such rollers quickly contact the inner race surface 50 and are energized thereby to wedge between the ramp wall and the inner race surface. The starting mechanism thus cycles to an on condition characterized by the rollers 60 being wedged between the ramp walls 56 and the inner race surface 50, FIG. 4. In the on condition of the starting mechanism, the rollers 60 effect a positive driving connection between the free power turbine rotor 22 and the gasifier rotor 20 so that as the unfeathered propeller blades extract progressively more energy from the passing airstream, the gasifier rotor is driven forward with sufficient speed to sustain combustion in the combustor 18.

As hot gas motive fluid begins flowing from the combustor, the rotors 20 and 22 accelerate together. So long as torque is transferred through the rollers 60, the starting mechanism 44 remains in the on condition. When the normal forward speed of the propeller and free power turbine rotor is achieved, the rollers 60 stop transferring torque and the gasifier rotor accelerates toward its normal forward speed. Concurrently, the rollers 60 move under centrifugal to the wide ends of the pockets 54 thereby cycling the starting mechanism back to the off condition.

Figure 5:
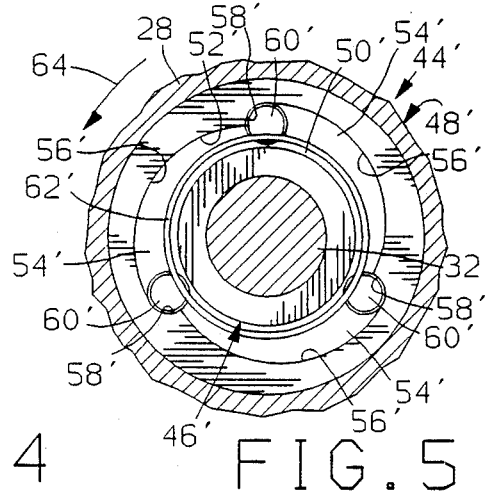
FIG. 5 is similar to FIG. 2 but showing a modified embodiment of the in-flight starting mechanism according to this invention in the off condition.

FIG. 5 illustrates a modified embodiment 44' of the starting mechanism according to this invention suited for applications where a rotating portion of the gasifier rotor is located radially inboard of a rotating portion of the free power turbine rotor or low pressure spool. The modified embodiment 44' includes an inner race 46' adapted for connection to the gasifier rotor and an outer race 48' adapted for connection to the free power turbine rotor. A plurality of cylindrical rollers 60' are disposed in wedge shaped pockets 54' in the outer race 48' and are separated by a cage 62'. A ramp wall 56' of each pocket 54' flares radially out from an inside surface 52' of the outer race and intersects a generally radial end wall 58' of the corresponding pocket. The modified starting mechanism 44' has an off condition characterized by the rollers 60' abutting the end walls 58' out of contact with the inner race surface 50', a ready condition characterized by at least one of the rollers engaging the inner race surface 50', and an on condition characterized by the rollers 50' being wedged between the ramp walls 56' and the inner race surface 50'.

In the modified starting mechanism 44', the centrifugal force on the rollers developed by rotation of the free power turbine rotor biases the rollers against the ramp walls and toward the end walls 58' of the pockets 54' and maintains the starting mechanism in the off condition. If the gas turbine engine is shutdown in flight, gravity moves at least one of the rollers against the inner race surface 50'. Thereafter, as the propeller blades are progressively feathered, the outer race 48' begins turning forward the direction of arrow 64, FIG. 5, relative to the substantially stopped inner race 46' connected to the gasifier rotor. Because the direction of movement of the inner race surface 50' relative to the outer race 48' is toward the narrow ends of the pockets 54', the rollers in contact with he inner race surface are urged toward the narrow ends of the corresponding pockets wedged between the ramp walls 56' and the inner race surface. Concurrently, the cage 62' urges any roller not in contact with the inner race surface toward the narrow end of the corresponding pocket during which movement the roller contacts the inner race surface and is energized thereby to wedge between the corresponding ramp wall and the inner race surface.

The embodiments of the invention in which an exclusive property or privilege is claimed are defined as follows:

1. In an aircraft propulsion gas turbine engine including
    a source of hot gas motive fluid,
    a first rotor rotatable by said hot gas motive fluid in a propelling direction about a main axis of said engine and having a compressor portion,
    a second rotor rotatable by said hot gas motive fluid about said main axis in said propelling direction independently of said first rotor and drivingly connected to a variable pitch aircraft propeller,
        said second rotor having a feathered condition corresponding to a feathered condition of said propeller wherein a moving airstream imparts substantially no energy to said propeller and a plurality of progressively more unfeathered conditions corresponding to progressively more unfeathered positions of said propeller characterized by progressively increasing energy transfer between said moving air stream and said propeller so that said moving air stream rotates said second rotor in said propelling direction as said propeller moves from said feathered position through said plurality of unfeathered positions,
    an in-flight starting mechanism comprising:
    a ring-like inner race rotatable as a unit with one of said first and said second rotors and having a cylindrical inner race surface,
    a ring-like outer race around said inner race rotatable as a unit with the other of said first and said second rotors and having an inside surface facing said inner race surface,
    means on said outer race defining a plurality of pockets in said inside surface opening toward and circumferentially spaced around said inner race surface,
    a plurality of rolling elements disposed in respective ones of said pockets each moveable between a first position in said pocket remote from said inner race surface and corresponding to an off condition of said starting mechanism and a second position wedged between said outer race and said inner race surface and corresponding to an on condition of said starting mechanism,
        each of said rolling elements being centrifugally biased to said first position when each of said first and said second rotors is rotated in said propelling direction by said hot gas motive fluid at speeds corresponding generally to an idle speed of said engine, and
    means on said outer race and on said inner race operative to move said rolling elements from said first positions to said second positions in response to rotation of said second rotor in said propelling direction after each of said first and said second rotors is substantially stopped whereby said second rotor is drivingly connected to said first rotor through said rolling elements so that said second rotor in said unfeathered conditions is operative to backdrive said first rotor.

2. In an aircraft propulsion gas turbine engine including
    a source of hot gas motive fluid,
    a first rotor rotatable by said hot gas motive fluid in a propelling direction about a main axis of said engine and having a compressor portion,
    a second rotor rotatable by said hot gas motive fluid about said main axis in said propelling direction independently of said first rotor and drivingly connected to a variable pitch aircraft propeller,
        said second rotor having a feathered condition corresponding to a feathered position of said propeller wherein a moving airstream imparts substantially no energy to said propeller and a plurality of progressively more unfeathered conditions corresponding to progressively more unfeathered positions of said propeller characterized by progressively increasing energy transfer between said moving air stream and said propeller so that said moving air stream rotates said second rotor in said propelling direction as said propeller moves from said feathered position through said plurality of unfeathered positions,
    an in-flight starting mechanism comprising:
    a ring-like inner race rotatable as a unit with one of said first and said second rotors and having a cylindrical inner race surface,
    a ring-like outer race around said inner race rotatable as a unit with the other of said first and said second rotors and having an inside surface facing said inner race surface,
    means on said outer race defining a plurality of wedge shaped pockets in said inside surface opening toward and circumferentially spaced around said inner race surface,
        each of said pockets having a ramp wall flaring radially out from said inside surface and a generally radially extending end wall intersecting said ramp wall at a wide end of said wedge shaped pocket,
        said inner race surface moving from said wide end of each of said pockets toward a narrow end of each of said pockets when said second rotor rotates in said propelling direction relative to said first rotor,
    a cylindrical roller disposed in each of said pockets moveable between a first position in said pocket abutting each of said ramp wall and said end wall remote from said inner race surface and a second position remote from said end wall and wedged between said ramp wall and said inner race surface, said first positions of said rollers corresponding to an off condition of said starting mechanism and said second positions of said rollers corresponding to an on condition of said starting mechanism, each of said rollers being centrifugally biased to said first position when each of said first and said second rotors is rotated in said propelling direction by said hot gas motive fluid at speeds corresponding generally to an idle speed of said engine, at least one of said rollers being moved by gravity from said first position to an intermediate position contacting said inner race surface when each of said first and said second rotors substantially stops rotating and thereafter being energized by said inner race surface to said second position when said second rotor commences rotation in said propelling direction relative to said first rotor, and a roller cage disposed between said inner and said outer races operative to synchronize the circumferential positions of each of said rollers so that each of said rollers moves to said second position in response to rotation of said second rotor in said propelling direction after each of said first and said second rotors is substantially stopped whereby said second rotor is drivingly connected to said first rotor through said rollers so that said propeller in said unfeathered positions is operative to backdrive said first rotor.

* * * * *